UNITED STATES PATENT OFFICE.

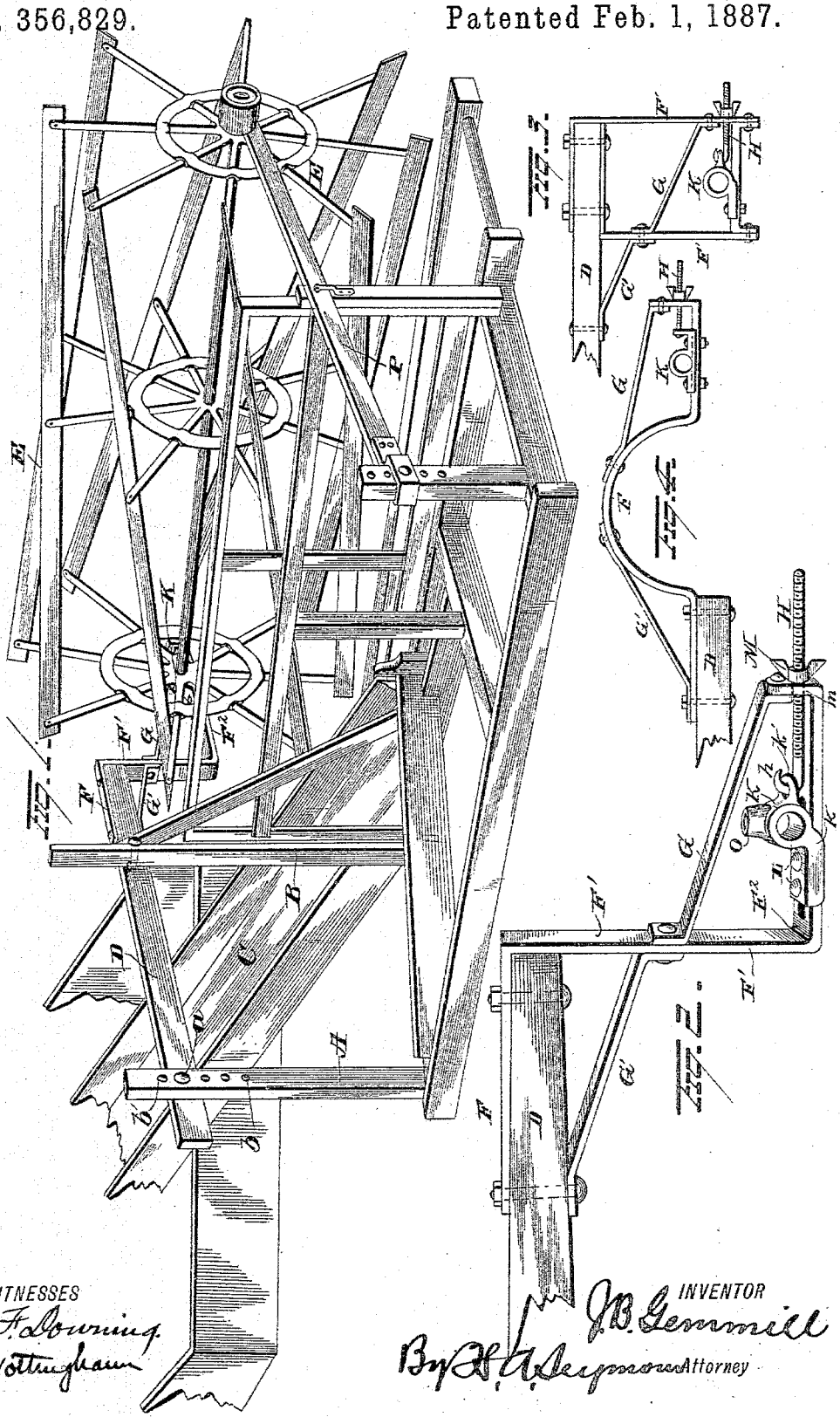

JOHN B. GEMMILL, OF RED BLUFF, CALIFORNIA.

REEL-SUPPORTING ARM.

SPECIFICATION forming part of Letters Patent No. 356,829, dated February 1, 1887.

Application filed August 13, 1886. Serial No. 210,804. (No model.)

*To all whom it may concern:*

Be it known that I, JOHN B. GEMMILL, of Red Bluff, in the county of Tehama and State of California, have invented certain new and useful Improvements in Reel-Supporting Arms; and I do hereby declare the following to be a full, clear, and exact description of the invention, such as will enable others skilled in the art to which it appertains to make and use the same.

My invention relates to an improvement in harvesters.

In Letters Patent No. 329,158, granted to me on October 27, 1885, a supporting-arm for the reel of a harvester was shown and described, adapted to allow the free passage of the grain from the platform of the reaper to the elevator, and capable of being vertically adjusted to suit different heights of grain.

The object of my present invention is to provide a reel-supporting arm which shall possess the advantages of the one above referred to, and which shall possess further advantages in its specific construction, tending to lessen its cost of manufacture and rendering its adaptation more general.

A further object is to provide an adjustable bearing on a reel-supporting arm, whereby the reel may be advanced or drawn back as the circumstances may require.

With these ends in view my invention consists in certain features of construction and combinations of parts, as will be hereinafter described, and pointed out in the claims.

In the accompanying drawings, Figure 1 is a view of a portion of a harvester embodying my invention, and Fig. 2 is a detached view of the reel-supporting arm and adjustable bearing. Figs. 3 and 4 are modifications.

A and B represent standards secured to the frame of the reaper at its end toward the elevator, the former at the rear corner, and the latter at or near the rear edge of the trough or passage-way C, in which the elevator is located.

The arm D, which is adapted to support the outer or elevator end of the reel E, is pivotally secured to the standard B, and its rear end is adapted to be secured by a pin, $a$, or other suitable means, to the standard A in different vertical adjustments. A series of holes, $b$, through the standard serve, in connection with the pin $a$ and a perforation through the arm D, as a convenient means for adjusting the arm.

The arm D is located at such a height that the grain will travel freely beneath its forwardly-projecting end without any liability of becoming choked or impeded by engagement therewith, and in order to bring the bearing for the reel E down to a position which it is desirable that it should occupy I provide a hanger, as follows: A piece of metal, preferably wrought-iron, is bent step-shaped, as shown, the upper section, F, being adapted to rest horizontally, or nearly so, on the upper side or edge of the arm D, the middle section, F', extending downward over the end of the arm D to a point in or near the horizontal plane of the axis of the reel, and the lower section, F², extending forward a short distance beyond the position which the end of the reel shaft or axle would naturally occupy. The forward end of the section F² is turned upward at right angles to the main portion of the section and forms a bearing for the adjusting-bolt H. A diagonal brace-rod, G, is bolted to the end of the upturned portion of the section F² and to the section F' at about its middle point, and a second brace-rod, G', extends from the middle of the section F' to the under side of the arm D. The same bolt which secures the end of the rod G to the section F' conveniently secures the end of the rod G' thereto.

K represents a journal-box having a grooved arm or projection, $k$, attached to one side thereof, and an eye, $k'$, attached to the opposite side. The grooved arm $k$ and eye $k'$ are preferably formed integral with the journal-box. The former is adapted to embrace the top and side edges of the section F², and is provided with one or more bolt-holes, preferably two, adapted to receive bolts L for securing the box K firmly to the section. The bolts L work in a single elongated slot in the section F² or in two or more elongated slots, which admit of the box K being slid along the section when the nuts on the bolts are loosened; or the section F² might be provided with a series of bolt-holes adapted to receive the bolts L, and thus rendering the box adjustable on the section F² at short intervals.

The adjusting bolt or rod H is provided with a hook, h, at one end, adapted to engage the eye k', and is screw-threaded throughout the greater portion of its length. It is adapted to slide freely within a perforation, m, formed in the upturned portion of the section F², and a thumb-nut, M, is adapted to work thereon in engagement with the front side of the said upturned portion of the section F², thereby either drawing the journal-box K forwardly along the section F² or admitting of its being slid rearwardly thereon by pressing on the end of the bolt H. The thumb-nut M also serves to take up any slack which may exist after the bolts L have been tightened.

The top of the journal-box K is conveniently provided with an oil-cup, O; but a simple oil-hole might be employed, if desired.

The tilting arm D, in conjunction with the vertically-adjustable support P at the opposite end of the reel, enables the reel to be set at any desired elevation, while the horizontally-sliding bearing K, either alone or in combination with a similar bearing at the opposite end, admits of the reel being set at such an angle to the grain, or toward or away from the grain, as to produce the best results.

The hanger and bearing are of such simple design that they may be readily constructed by any ordinary blacksmith, and both arm and hanger may be applied to a machine without the employment of skilled labor.

The modification shown in Fig. 3 consists in a pair of depending sections, F', connected at their lower ends by a cross-bar provided with the adjustable bearing, and braced, as in the former construction.

In Fig. 4 the arm D is constructed to be set lower on the standards A and B, and the hanger is arched to admit of the free passage of the grain. In this construction the braces G and G' extend from the forward end of the arm to the crown of the arch and from the crown of the arch to the arm D, respectively.

It is evident that other slight changes might be resorted to in the form and arrangement of the several parts described without departing from the spirit and scope of my invention; hence I do not wish to limit myself strictly to the construction herein set forth; but, Having fully described my invention, what I claim as new, and desire to secure by Letters Patent, is—

1. The combination, with an arm for supporting the outer or elevator end of a harvester-reel, of a reel-bearing hanger secured to the forward end of the arm, the forward end of the hanger being turned at right angles, or nearly so, to the bearing-section and adapted to form a support for a bearing-adjusting bolt, a journal-box mounted on said hanger, and an adjustable bolt, substantially as set forth.

2. The combination, with an arm for supporting the outer or elevator end of a harvester-reel, of a reel-bearing hanger secured to the forward end of the arm, said hanger consisting, essentially, of a solid bar of metal bent in zigzag or step form and adapted to be bolted to the said arm, and a journal-box mounted on said hanger, substantially as set forth.

3. In a harvester, the combination, with an arm located in tilting adjustment across and above the path of the elevator, of a hanger secured to the forward end of the arm and having an upturned end, a journal-box adjustably secured to the lower section of the hanger, an adjusting bolt or rod attached to the said journal-box and extending through the upturned end of the hanger, and a nut for moving the bolt, substantially as set forth.

4. The reel-supporting hanger consisting, essentially, of a zigzag piece of solid metal having an upturned outer end, a diagonal brace extending from the upturned end of the lower section to the middle section, a second diagonal brace extending from the middle section to the supporting-arm, to which the hanger is secured, the sliding journal-box, and the box-adjusting bolt passing through the upturned end of the hanger and a nut, the whole constructed and arranged substantially as set forth.

In testimony whereof I have signed this specification in the presence of two subscribing witnesses.

JOHN B. GEMMILL.

Witnesses:
  N. P. CHIPMAN,
  JAS. R. TAPSCOTT.